United States Patent [19]

Stift

[11] 4,384,886
[45] May 24, 1983

[54] PROCESS FOR ZINC REMOVAL FROM OXIDE-CONTAINING IRON SOURCES

[75] Inventor: Kurt Stift, Leoben, Austria

[73] Assignee: Voest-Alpine Aktiengesellschaft, Vienna, Austria

[21] Appl. No.: 289,732

[22] Filed: Aug. 3, 1981

[51] Int. Cl.³ .............................................. C22B 19/06
[52] U.S. Cl. ............................................ 75/25; 75/88
[58] Field of Search ......................... 75/14, 25, 88, 1; 266/154

[56] References Cited

U.S. PATENT DOCUMENTS 3,756,804  9/1973  Stevenson ............................... 75/88
4,260,139  4/1981  Oliver ................................... 266/154

*Primary Examiner*—M. J. Andrews
*Attorney, Agent, or Firm*—Cushman, Darby & Cushman

[57] ABSTRACT

Figure 1:
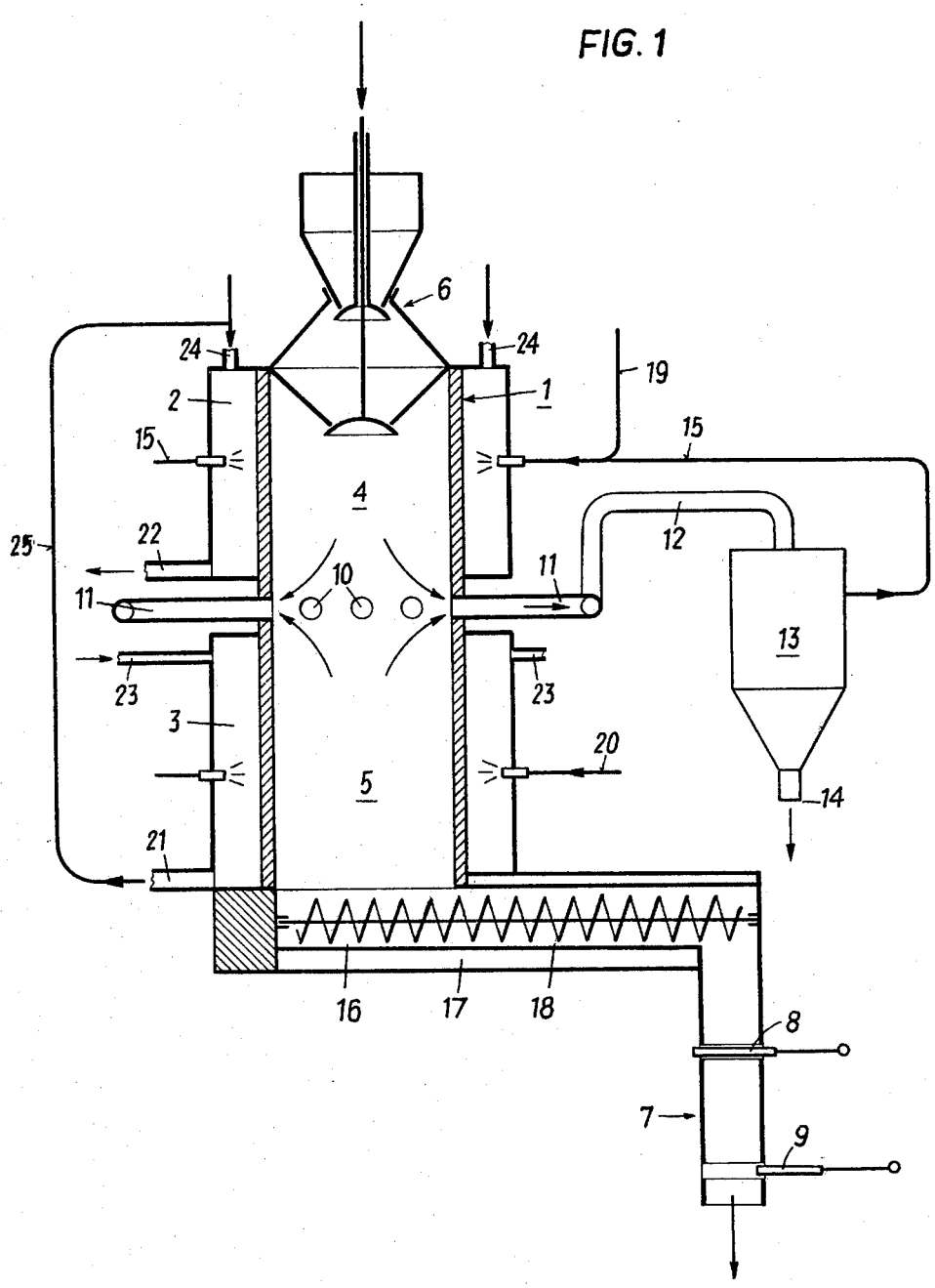

For removing zinc from oxide-containing iron sources, the iron source is in form of lump having a minimum grain size of 5 mm supplied together with lumpy reducing agents to a shaft-like muffle furnace being adapted to be gas-tightly closed. The muffle furnace is externally heated, for which purpose combustion chambers (2 and 3) are provided. Within the upper portion of the muffle furnace (1), the furnace charge flows through a pre-heating and pre-reduction zone (4) and subsequently to a reduction zone (5) before the reduced material is being discharged. Volatized zinc is withdrawn together with reaction gases at at least one cross-sectional plane located between the supply end and the discharge end of the muffle furnace, preferably located at the level of the upper end of the reaction zone (5). The apparatus for performing this process consists of a muffle furnace (1) which is adapted to be gas-tightly closed at its supply end and its discharge end and having within its wall and between said both ends gas outlet openings (10) which enter by by-passing the or extending through the heating means, for example combustion chambers (2, 3), arranged externally of the muffle furnace. Preferably, several combustion chambers are provided in axial direction of the muffle furnace, the gas outlet openings (10) being connected to conduits (11) arranged between the combustion chambers. The reduction gases can, after having separated the zinc, be recycled to one combustion chamber (2, 3) (FIG. 1).

15 Claims, 3 Drawing Figures

PROCESS FOR ZINC REMOVAL FROM OXIDE-CONTAINING IRON SOURCES

The invention refers to a process for zinc removal from oxide-containing iron sources such as, for example, iron ores, mill waste, in particular mill dust, in which the iron source having a minimum grain size of 5 mm is, optionally together with additives such as lime, introduced, together with lumpy reducing agents, in particular coal into a shaft-like muffle furnace being adapted to be gas-tightly closed at its both ends and to be externally heated, the charge travelling, between the supply end and the discharge end of the muffle furnace, through a heating zone and a reduction zone as well as a reaction zone. The invention further refers to an apparatus for performing this process. Such a process is suitable to produce iron sponge directly with a direct reduction. Iron sources containing zinc are responsible for several troubles in the blast furnace performance, the zinc forming, above all, undesired crusts on the furnace brick lining or penetrating into the furnace brick lining. In addition to the destroying influence of the zinc on the furnace brick lining and to the impediment of the furnace blast performance by the zinc, the zinc has also an unfavourable influence on the blast furnace performance. The pig iron becomes cooled by downwardly moving zinc crusts and the slag becomes more viscous. These detrimental influences result in an increase of the coke consumption. Hot operating with high temperature of the blast furnace gas greatly contributes to removal of the zinc from the furnace together with the gas and the dust. When banking out these dusts in usual manner there results a substantial loss in iron together with non-ferrous metals. Because reusal of galvanized scrap in steel works will still increase, no relief can be expected when using such mill dusts in the steel production.

It is also known to reductively evaporate zinc in rotary kilns, and thereby to obtain a residue which contains the iron predominantly in metallic form and which can be recycled into the pig iron production and the steel production, respectively. Such so-called rotary-furnace processes are, however, only economical when processing at least approximately 150,000 metric tons per year of mill dusts or furnace dusts brought into lumpy form.

It is now an object of the present invention to provide a process of the type initially mentioned which is suitable to process in an economical manner also small amounts of furnace dusts containing zinc and brought into lump form. Starting from the process initially mentioned and having become known for directly reducing iron ore, the invention essentially consists in that the reaction gases are withdrawn from the muffle furnace at at least one cross-sectional plane located between the ends of the muffle furnace and preferably located at the upper end of the reaction zone. Within such a shaft-like muffle furnace $Fe_2O_3$ as well as $Fe_3O_4$ (hematite, magnetite and so on) is within a first zone pre-heated and pre-reduced to FeO (Wüstite). Within this pre-heating and pre-reduction zone, heating shall be effected as rapidly as possible to avoid disturbing side-effects of the lumpy reducing agent. Within the subsequent reaction zone, the FeO formed is reduced by the reducing agent to metallic iron. Likewise, the zinc oxides of the charge are reacting with the reducing agent to form metallic zinc according to the reaction equation $$ZnO + C = Zn + CO.$$

Within this reaction zone, the temperatures are increased up to 900° to 1100° C. so that the metallic zinc formed will be evaporated. If the evaporated zinc enters zones of the muffle furnace being at a lower temperature than the boiling point of the zinc, the zinc becomes condensed again and there is the risk that zinc becomes oxidized to zinc oxide by $CO_2$ according to the reaction equation $$Zn + CO_2 = ZnO + CO.$$

Such a re-oxidation could easily take place in cooler zones of the muffle furnace, for example, at temperatures of approximately 500° C. For the purpose of removing the zinc from the reduced material to be discharged, the muffle furnace is, according to the invention, closed at its both ends in a gas-tight manner. The reduction gases generating within the muffle furnace a positive pressure are now withdrawn at a cross-sectional plane of the muffle furnace located between the upper end and the lower end, so that the zinc can be withdrawn as a gas. The cross-sectional plane at which the reaction gases are to be withdrawn must be located at a certain distance from the supply end of the muffle furnace because condensation of the gaseous zinc could not be avoided at the supply end of the muffle furnace. But also the risk of a re-oxidation of the zinc in cooler zones of the muffle furnace shall be avoided and, therefore, it is proposed to withdraw the reaction gases preferably at the upper end of the reaction zone. This results in advantages with respect to the energy balance of the process, because the reaction gases can act with their sensible heat on the furnace charge over a height of a layer of the charge being as high as possible. Thus, for example, the hottest gases of the lower end of the muffle furnace flow in counter-current through the whole reaction zone and enhance the reduction of iron oxide to metallic iron. The reaction gases are preferably withdrawn via conduits passing through the combustion chamber or by-passing the combustion chamber, so that the zinc carried by the reaction gases can easily be separated. For this purpose it is sufficient to, for example, temporarily cool the reaction gases below the boiling point of the zinc for removing the condensate. Under circumstances, even alkali metals can be separated in this manner.

For the purpose of keeping the amount of zinc condensed within the muffle furnace as low as possible and, above all, for avoiding the risk of a re-oxidation of the zinc to zinc oxide, the reaction gases are preferably withdrawn from such a zone of the muffle furnace in which resides a temperature of more than 650° C., preferably of 700° to 900° C. The gas temperatures within these zones may easily exceed the indicated temperatures for the charge within these zones. At temperatures exceeding 650° C., the vapour pressure of zinc exceeds already 0.1 bar so that zinc can be withdrawn in the vapour phase already at these temperatures and higher temperatures. The temperature of the reaction gases shall preferably exceed 906° C. At this temperature complete evaporation of the zinc is reliably obtained.

The process according to the invention is preferably performed such that the cross-sectional plane at which the reaction gases are withdrawn is being arranged at a distance from the supply end of the muffle furnace where complete conversion of $Fe_2O_3$ and $Fe_3O_4$ to FeO is reliably obtained. After the conversion to FeO, the oxygen which can be supplied by the furnace charge has already become reduced to such an extent that there is no risk of a re-oxidation of the zinc to zinc oxide at the prevailing temperatures. The reaction gases could also be withdrawn from the reaction zone at cross-sectional planes located at a lower level, but such shifting of the withdrawal plane in direction to the discharge end of the muffle furnace results in drawbacks with respect to the energy consumption. With increasing distance of the withdrawal plane from the supply end of the muffle furnace, the reaction gases would be withdrawn with higher temperatures and the time interval over which the hot reaction gases can act on the furnace charge would be shortened when shifting the withdrawal plane for the reaction gases in such a manner.

In view of the energy balance of the process it is of advantage to rapidly effect pre-heating and pre-reduction and then to maintain essentially constant the temperature within the subsequent reaction zone. A particularly suitable cross-sectional plane for withdrawing the reaction gases results, in this case, if the reaction gases are withdrawn from such a cross-sectional plane of the muffle furnace in which the temperature difference between this cross-sectional plane and a cross-sectional plane located adjacent seen in flow direction of the charge is smaller than between immediately preceding equidistant cross-sectional planes. In view of neither the absolute length of the pre-heating zone and the pre-reduction zone nor the absolute length of the reaction zone being the same for all types of charge, a sharp bend of the curve representing the temperature gradient over the axial length of the muffle furnace is a well suitable criterion for selecting the cross-sectional plane at which the reaction gases can be withdrawn in a particularly favourable manner.

With this usual operating manner, being known, for example, in connection with direct reduction processes for producing iron sponge, the iron sponge particles are discharged from the muffle furnace together with slag at a temperature of approximately 900° to 1050° C., whereupon the slag is separated from the iron sponge particles in a known manner, for example, by magnetic separators.

The inventive apparatus for performing the process described above has a muffle furnace preferably built of silicon carbide bricks and is essentially characterized in that the muffle furnace is adapted for being gas-tightly closed at its supply end and at its discharge end, and in that the wall of the muffle furnace is provided with gas outlet openings at an area located between said both ends, said openings entering by by-passing the or extending through the heating means externally arranged. The gas-tight closure of the supply end can, for example, be effected by means of a usual twin furnace-top bell. A cooled conveyor means, for example, a water-cooled conveyor screw, is, as a rule, connected to the discharge end of the muffle furnace, noting that the gas-tight closure can be obtained by means of a twin-lock provided with slides.

Muffle furnaces of the type to be used according to the invention basically differ from rotary kilns by an exact separation of the reducing furnace atmosphere from the oxidizing atmosphere of the energy supply. Of course, the muffle furnace could be electrically heated but the usual heating means is an external heating means provided with burners. The apparatus according to the invention is modified with respect to known apparatuses such that the heating means is formed of at least two combustion chambers externally surrounding the muffle furnace and arranged, as seen in axial direction of the muffle furnace, one after the other and in that conduits arranged between adjacent combustion chambers are connected to the gas outlet openings of the muffle furnace. Even when subdividing the heating means into individual chambers, a sufficiently high temperature can be maintained between the heating chambers for preventing immediate condensation of the withdrawn zinc. The conduits arranged between the combustion chambers are not exposed to the oxidizing atmosphere of the combustion chambers and are thus less subject to corrosion. Starting from the gas outlet openings, the conduits can be downwardly inclined to prevent return of condensed zinc, if any, into the muffle furnace. The process according to the invention can be controlled in a particularly simple manner when using an apparatus in which the combustion chamber located adjacent to the supply end extends substantially over the axial length of the pre-heating and pre-reduction zone and preferably over approximately one third of the axial length of the muffle furnace. This first combustion chamber can for the purpose of obtaining the desired rapid heating be provided with a higher number of burners which are preferably arranged in planes succeeding one another in flow direction of the furnace charge. Within this first combustion chamber, the distance between the burner planes can be selected smaller than in the subsequent combustion chamber enclosing the reaction zone because in said reaction zone it is only necessary to maintain the temperature already obtained. For improving the energy balance, the combustion gases coming from the combustion chamber enclosing the reaction zone can be supplied to the combustion chamber enclosing the pre-heating and pre-reduction zone. If the first combustion chamber extends over the whole pre-heating and pre-reduction zone, the gas outlet openings are distributed over the circumference of the muffle furnace immediately below the said first combustion chamber. The gas outlet openings can, in this case, open into annular chambers enclosing the muffle furnace and having their bottom preferably outwardly and downwardly inclined. Such inclination of the bottom of the annular chambers warrants flow of condensed zinc in outward direction. In an advantageous manner, the muffle furnace can be lined at the area of the gas outlet openings with zinc-resistant refractory bricks, noting that the gas outlet openings are preferably arranged with a distance from the supply end of the muffle furnace corresponding to 30 to 50% of the axial length of the muffle furnace. Such dimensioning is, as experience has shown, within the optimum range for withdrawal of the reaction gases.

Separation of the zinc carried by the reaction gases can in a simple manner be effected by connecting via conduits the gas outlet openings with a purifying means, particularly with a cooling means for condensing gaseous zinc.

For improving the energy balance, the hot reaction gases can, after having been purified, be recycled to one combustion chamber. The reaction gases can be completely burnt within these combustion chambers and enter these combustion chambers with a substantial proportion of their original heat content.

Muffle furnaces used for direct reduction processes are, according to the prior art, designed to conically flare from the supply end in direction to the discharge end. According to the invention, it is now proposed to provide such an enlargement in cross section only within the area of the pre-heating and pre-reduction zone and to thus avoid within this area any compression of the charge and thus any reduction of its porosity and its gas permeability. A furnace portion of constant cross section is now, according to the invention, following the mentioned conically flaring portion of the muffle furnace. With this embodiment, the conicity can be selected substantially greater in this critical area of rapid heating without increasing the overall diameter of the muffle furnace at the area of the reaction zone to an undesired great size. Too great a diameter would adversely influence the heat transition from the combustion chambers to the centre area of the downwardly moving furnace charge. On the other hand, too small a conicity, as is frequently encountered with steadily conically flaring muffle furnaces, would still result in the risk of coalescing the compressing the charge and thus in a reduction of the porosity of the charge and in a reduction of the output.

In the following, the invention is further illustrated with reference to embodiments of an apparatus according to the invention shown in the drawing.

In the drawing

Figure 2:
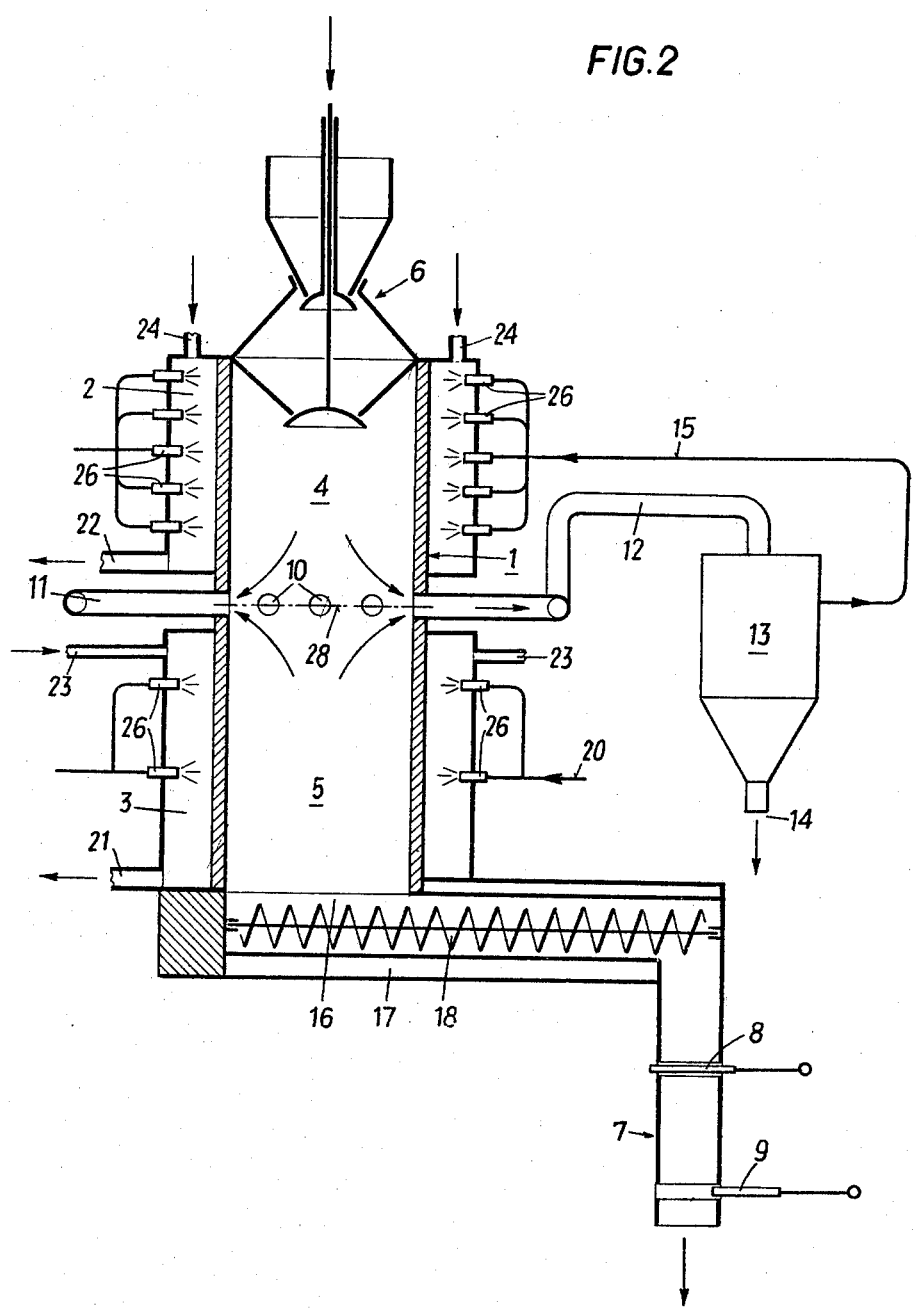
Figure 3:
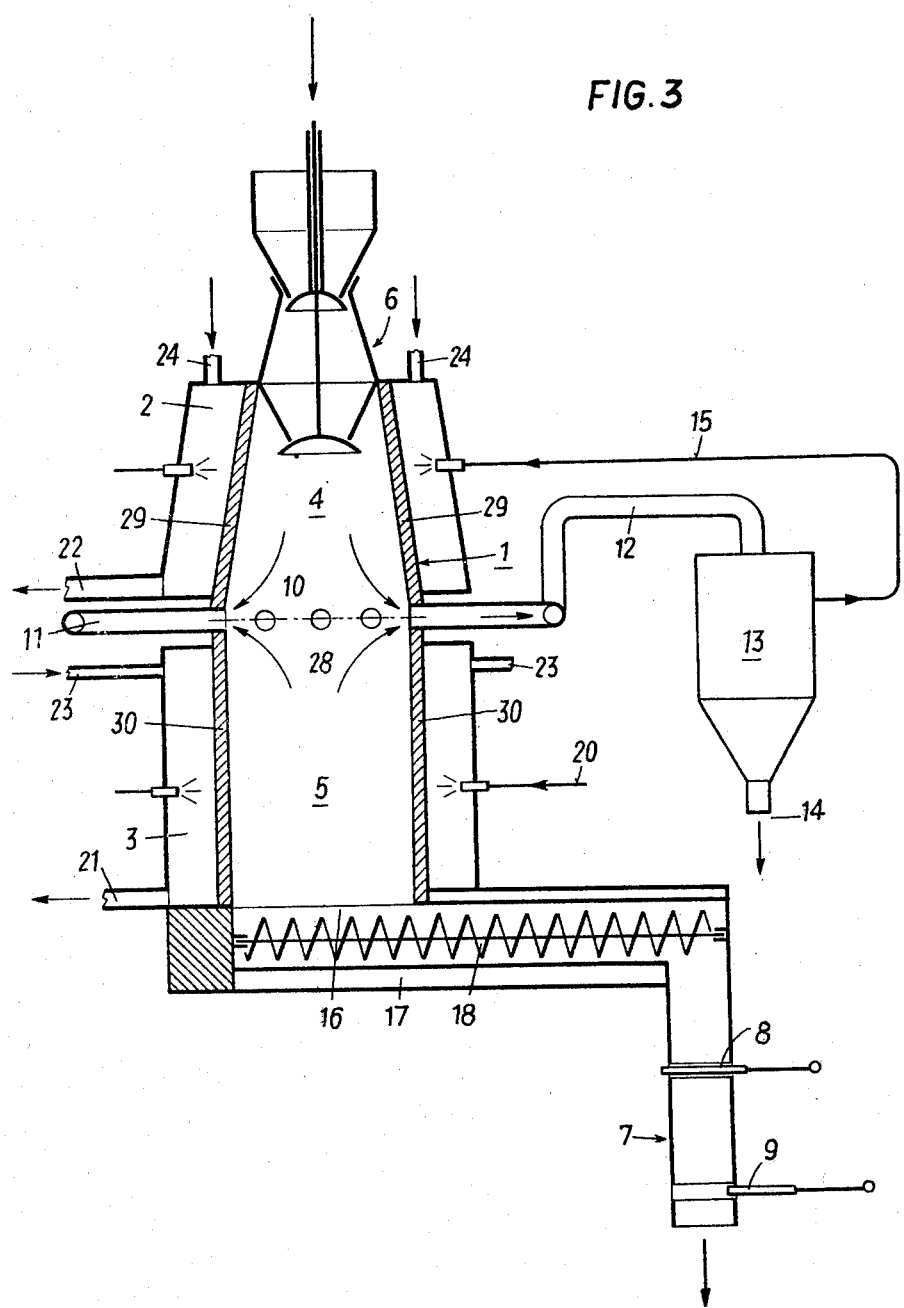

FIG. 1 is a schematical representation of a shaft-like muffle furnace according to the invention, FIG. 2 shows a modified embodiment of the combustion chambers in an embodiment according to FIG. 1 and FIG. 3 shows a further embodiment of a shaft-like muffle furnace according to the invention.

In FIG. 1, there is shown a cylindrical or prismatical shaft-like muffle furnace 1 being provided with two combustion chambers 2 and 3. The combustion chamber 2 surrounds the pre-heating and pre-reduction zone 4, whereas the combustion chamber 3 surrounds the reaction zone 5 proper. The shaft-like muffle furnace can be gas-tightly closed at its supply end by a twin furnace-top bell 6 and at its discharge end by a twin lock 7 provided with gate valves 8 and 9. Gas outlet openings 10 are provided between the combustion chambers 2 and 3 and distributed over the circumference of the muffle furnace 1 and are connected with a gas purifying means 13 via conduits 11 and 12. The reaction gases withdrawn via the gas outlet openings 10 are cooled within the purifying means 13 below the boiling point of the zinc so that the metallic zinc as well as the dust obtained in the gas purifying stage can be discharged from the gas purifying means 13 via the discharge opening 14. The hot reaction gases coming from the purification stage are, via a conduit 15, recycled to the combustion chamber 2 and/or 3 and serve there the purpose of pre-heating the charge and heating the reaction zone, respectively. A water-cooling means 17 is provided at the lower end 16 of the muffle furnace 1. The downwardly moving charge is discharged by means of a water-cooled conveyor screw 18 and conveyed to the twin lock 7.

Fuel gas is supplied to the combustion chambers 2 and 3 via conduits 19 and 20. Natural gas, methane and/or flue gas in any desired mixing ratio can, for example, be used as the fuel gas. The waste gases are withdrawn from the respective combustion chambers via conduits 21, 22. Combustion air is additionally supplied to the combustion chambers 2 and 3 via conduits 23 and 24. The hot combustion gases coming from the lower combustion chamber can be supplied to the upper combustion chamber 2 via a conduit 25 or can be used for pre-heating the combustion air with interposition of a heat exchanger. In the representation according to FIG. 2 the reference numerals used in FIG. 1 are used for equal constructional parts. The upper combustion chamber 2 surrounding the pre-heating and pre-reduction zone 4 has a plurality of burners 26 arranged in different planes, the distance of which becomes greater in moving direction 27 of the furnace charge. Within the combustion chambers 3 surrounding the reaction zone 5 only a smaller number of burners 26 is required because within this area of the muffle furnace no further temperature increase is necessary and only the selected and adjusted temperatures shall be maintained. The gas outlet openings 10 are located within a cross-sectional plane 28 in its turn located below the depth and between said both zones 4 and 5 of the muffle furnace.

Methane can, for example, be supplied to the burners as the fuel gas.

In the embodiment according to FIG. 3 the walls 29 of the muffle furnace extend within the range of the pre-heating and pre-reduction zone 4 and starting the supply end of the furnace in a divergent manner, said walls 29 adjoining mutually parallel walls 30 at the area of the reaction zone 5. The gas outlet openings 10 are located in the cross-sectional plane 28 in which the diverging walls 29 adjoin the parallel walls 30. Constructional parts being equivalent to those shown in FIG. 1 and 2 are again given the same reference numerals.

In the described apparatuses the process according to the invention proceeds in the following manner.

Zinc-containing mill dust or zinc ore concentrates are brought into lump form in usual manner (pelletizing, briquetting, kneading). In case that the dust or the concentrate has no intrinsic hydraulic properties as are required for making lumps and curing same without additional binding agents, there are used as binding agents usual additives, such as pitch, sulphide liquor residues, bitumen, bentonite and so on. The zinc-containing dust or concentrate having been brought into lumpy form must, after having become cured or hardened, have a mechanical strength and porosity sufficient for the process sequence. For providing an intimate contact between the reducing agent and the oxygen to be removed from the metal oxide, carbon can, in the form of coal, petrol coke and so on, be added to the zinc-containing starting material prior to bringing and/or after having brought same into lump form. The required amount of reducing agent is dependent on the amount of oxygen to be removed and is greater than the stoichiometric amount and is calculated for approximately the 1.2-fold amount of oxygen. The lumpy charge is pre-dried by an external heat treatment. Such a drying operation is effected under temperatures at which the carbon added will not be burnt, preferably at temperatures below 450° C. Subsequently the lumpy material is, optionally together with additives such as lime reacting with sulphur, charged into the upright muffle furnace 1.

Within the upper portion of the muffle furnace there is effected complete drying and removal of other volatile constituents, if any, from the charged material as well as still further curing of the zinc-containing charge material.

Heat is supplied by means of the externally arranged combustion chambers 2, 3. The burners 26 arranged at different levels warrant adjustment of an optimum temperature gradient for the process sequence. The sinking speed is adapted to the charge and to the process sequence by giving the receptacle a corresponding profile (conical). The charge material is continuously sinking and travels through the cross-sectional plane 28 from which the zinc-containing gases are withdrawn from the furnace via an annular conduit. Zinc becomes evaporated at 906° C. For the purpose of avoiding condensation of zinc within the withdrawal conduits as well as within the downwardly moving furnace charge, the temperatures prevailing there shall be higher than the evaporating temperature of the zinc. The gases result from the reaction of the oxygen in the oxides with the carbon of the reducing agent as well as from the reaction of volatile constituents contained in coals with components of the charge.

The shaft can be charged via a twin furnace-top bell 6 and can be tightly closed at its upper end by this bell.

By sucking off of the zinc-containing gases from the plane 28 located below the depth, the surface temperature of the furnace charge can be adjusted such that the green charged material is not subjected to a thermal shock. By this measure, the furnace-top bell 6 is in addition not subjected to high temperatures.

The hot withdrawn and zinc-containing gases, the temperatures of which shall preferably be approximately 1050° C., are brought into the condensating chamber 13 and rapidly cooled below the dew point of the zinc. By this measure, the zinc, which is partially present in metallic form and/or oxide form, becomes separated and the separated zinc can be further processed.

The effluent gas freed of zinc is used for heating the shaft furnace so that its latent chemical heat as well as its sensible heat is again recycled into the process.

Within the externally heated furnace portion located below the withdrawal zone for gases, the reduction of the ZnO introduced together with the charge to metallic zinc already initiated within the furnace portion located above said withdrawal zone is further performed and also removal of oxygen chemically bound to iron is effected. The iron sponge formed as well as any excess reducing agent are, after having travelled through the cooling section 17, separated one from the other by magnetic separation.

Within the reducing portion of the furnace the following reactions take place:

|     |                                | J (Joule) per moles reacted |
| --- | ------------------------------ | --------------------------- |
| I   | $ZnO + C = Zn + CO$            | + 224 080                   |
| II  | $Fe_2O_3 + CO = 2FeO + CO_2$   | − 6 737                     |
| III | $2Fe_2O_3 + 3C = 4Fe + 3CO_2$  | + 462 360                   |
|     | $3CO_2 + 3C = 6CO$             | + 517 400                   |
|     | $2Fe_2O_3 + 6C = 4Fe + 6CO$    | + 979 760                   |
| IV  | $FeO + CO = Fe + CO_2$         | − 17 128                    |
|     | $CO_2 + C = 2CO$               | + 172 467                   |
|     | $FeO + C = Fe + CO$            | + 155 339                   |

The reactions taking place according to the equations I, III and IV require the supply of energy and use up carbon.

I claim:

1. A process for zinc removal from oxide-containing iron sources comprising introducing a charge of the iron source in a form having a minimum grain size of 5 mm together with a lumpy reducing agent into a muffle furnace having a generally vertical shaft which is heated by at least one annular combustion chamber and which is adapted to be closed in a gas-tight manner at its upper, supply end and its lower, discharge end; heating the furnace exteriorly; passing the charge downwardly through the furnace from the supply end to the discharge end whereby the charge travels sequentially through a heating zone, a reduction zone and a reaction zone and whereby reaction gases containing zinc vapors are formed; and withdrawing reaction gases from the furnace at at least one cross-sectional plane located between the ends of the furnace.

2. A process as in claim 1 wherein the iron sources are selected from the group selected from iron ore, mill waste and mill dust.

3. A process as in claim 1 wherein the charge also contains lime.

4. A process as in claim 1 wherein the reducing agent is coal.

5. A process as in claim 1 wherein the reaction gases are withdrawn from the furnace at the upper end of the reaction zone.

6. A process as in claim 1 wherein the reaction gases are withdrawn through conduits which bypass the combustion chamber.

7. A process as in claim 1 wherein the reaction gases are withdrawn from the furnace at a location where the temperature is greater than 650° C.

8. A process as in claim 1 wherein the reaction gases are withdrawn from the furnace at a location where the temperature is 700° C.–900° C.

9. A process as in claim 1 wherein the cross-sectional plane at which the reaction gases are withdrawn is at a distance from the supply end of the muffle furnace where complete conversion of $Fe_2O_3$ and $Fe_3O_4$ to FeO is warranted.

10. A process as in claim 1 wherein the reaction gases are withdrawn from such a cross-sectional plane of the muffle furnace in which the temperature difference between this cross-sectional plane and a cross-sectional plane located adjacent as seen in flow direction of the charge is smaller than between immediately preceding equidistant cross-sectional planes.

11. A process as in claim 1 wherein the reaction gases are withdrawn at temperatures exceeding 906° C.

12. A process as in claim 1 wherein the furnace is heated to reaction temperature in the reaction zone and is subsequently maintained over the whole axial length of the reaction zone at this reaction temperature.

13. A process as in claim 12 wherein heating within the heating zone is effected up to temperatures within the range 900° C.–1100° C.

14. A process as in claim 1 including removing zinc from the withdrawn reaction gases and supplying them to the combustion chamber.

15. A process as in claim 14 wherein the furnace includes a plurality of annular combustion chambers arranged one above the other and wherein the purified reaction gases are supplied to the uppermost combustion chamber.

* * * * *

UNITED STATES PATENT AND TRADEMARK OFFICE
CERTIFICATE OF CORRECTION

PATENT NO. : 4,384,886
DATED : May 24, 1983
INVENTOR(S) : Kurt Stift

It is certified that error appears in the above—identified patent and that said Letters Patent is hereby corrected as shown below:

In the heading:

Please add:

-- [30]  Foreign Application Priority Data

August 8, 1980       Austria..........A 4102/80 --

Signed and Sealed this

Twenty-fourth Day of April 1984

[SEAL]

*Attest:*

GERALD J. MOSSINGHOFF

*Attesting Officer*    *Commissioner of Patents and Trademarks*